(12) United States Patent
Takahara

(10) Patent No.: US 7,529,001 B2
(45) Date of Patent: May 5, 2009

(54) IMAGE READING APPARATUS

(75) Inventor: Hiroyuki Takahara, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/766,585

(22) Filed: Jun. 21, 2007

(65) Prior Publication Data
US 2008/0007799 A1 Jan. 10, 2008

(30) Foreign Application Priority Data
Jul. 7, 2006 (JP) ............................. 2006-188044

(51) Int. Cl.
G01C 19/68 (2006.01)
(52) U.S. Cl. ........................................ 358/474; 358/497
(58) Field of Classification Search ................. 358/474, 358/497
See application file for complete search history.

(56) References Cited
U.S. PATENT DOCUMENTS
4,976,556 A * 12/1990 Longrod ..................... 400/320
7,119,933 B2 * 10/2006 Sugimoto .................... 358/474
2004/0012823 A1 * 1/2004 Hendrix et al. ............. 358/474

FOREIGN PATENT DOCUMENTS
JP 07-184008 A 7/1995
JP 2004-054283 A 2/2004

* cited by examiner

Primary Examiner—Twyler L Haskins
Assistant Examiner—David L Suazo
(74) Attorney, Agent, or Firm—Canon USA Inc IP Div

(57) ABSTRACT

A scan guide upon image reading by an image reading apparatus having a driving mechanism constructed by a rack and a pinion gear is stably performed. The pinion gear is provided on a downstream side of two contact portions which are in contact with a guide rail of the reading scan. A straight line drawn in a pressure angle direction from a contact point of the rack and the pinion gear upon reading and scanning passes between the two contact portions with the guide rail, so that a stable positional relation between a driving force of the gear and the contact portions is obtained. The stable guiding can be performed.

6 Claims, 5 Drawing Sheets

SCAN DIRECTION ured toward the original

IMAGE READING APPARATUS

BACKGROUND OF THE INVENTION

1. Field of the Invention

The present invention relates to an image reading apparatus such as image scanner, facsimile apparatus, composite apparatus (or multifunction apparatus), copying apparatus, or the like having a function for reading images, or to an image reading unit of them.

2. Description of the Related Art

Hitherto, various systems have been devised with respect to an apparatus such as image scanner, facsimile apparatus, composite apparatus, copying apparatus, or the like having a function for reading images. In those image reading apparatuses, as a scan driving unit of a reading and scanning unit, there are various systems such as a system using a belt, a system using a wire, a system using a rack provided in the scan direction and a pinion gear which is engaged therewith (for example, refer to Japanese Patent Application Laid-Open No. 2004-054283), and the like.

Among those systems, in Japanese Patent Application Laid-Open No. 2004-054283, there is disclosed a technique in which for the driving using the rack and the pinion gear, a separating force of the rack and the pinion gear is used as a force adapted to press the reading and scanning unit to a guide rail of the scan. In Japanese Patent Application Laid-Open No. H07-184008, there is disclosed an image reading apparatus in which a pressing unit to the guide rail is separately provided in order to press the reading and scanning unit to the guide rail of the scan.

In the case of using the separating force of the rack and the pinion gear as a force adapted to press the reading and scanning unit to the guide rail of the scan, ordinarily, by changing a pressure angle of 20° of the gear to, for example, 30°, the force adapted to press to the guide rail (guiding force) can be increased. Thus, it is enabled to be hard to receive an influence of the vibration or the like. However, if the guiding force is increased by increasing the pressure angle, at the same time, a driving force adapted to scan-drive the reading and scanning unit is decreased and a driving efficiency is deteriorated. Generally, in order to reduce the driving force, a frictional force of the guide rail is controlled to a small value by using a low frictional material or the like. Since the separating force of the gear is in almost direct proportion to a coefficient of friction, if the frictional force is small, the separating force is small and the stable guiding force cannot be obtained. According to the construction in which the pressing unit to the guide rail is provided, since the number of parts increases, it is difficult to miniaturize the apparatus.

According to a type in which a motor for scan-driving is provided on the reading and scanning unit, a signal line to drive the motor is distributed from the apparatus main body to the reading and scanning unit and the motor is driven while pulling the signal line. Therefore, a force is applied to the reading and scanning unit from the signal line, so that the reading and scanning unit is moved in the inclined state or is unstable and liable to be influenced by the vibration or the like.

SUMMARY OF THE INVENTION

The invention is directed to an image reading apparatus which scans and reads an original document (hereinbelow, also referred to as an original) by using a rack and a pinion gear. Upon image reading and scanning, the stable scan is guided and an increase in apparatus size is avoided as much as possible.

According to an aspect of the invention, there is provided an image reading apparatus comprising: an original plate onto which an original is placed; an image reading unit operable to move and scan along the original plate; a frame supporting the original plate; a guide rail provided in the frame in parallel with a moving/scan direction of the image reading unit; and a rack provided in the frame in parallel with the guide rail. The image reading unit has a sensor configured to read the original, a pinion gear adapted to engage with the rack, a driving unit configured to drive the pinion gear, and two contact portions adapted to be come into contact with the guide rail. The pinion gear is arranged on a downstream side of the two contact portions in the moving/scan direction upon reading.

Further features of the present invention will become apparent from the following description of exemplary embodiments with reference to the attached drawings.

DESCRIPTION OF THE EMBODIMENTS

Embodiment

Figure 1A:
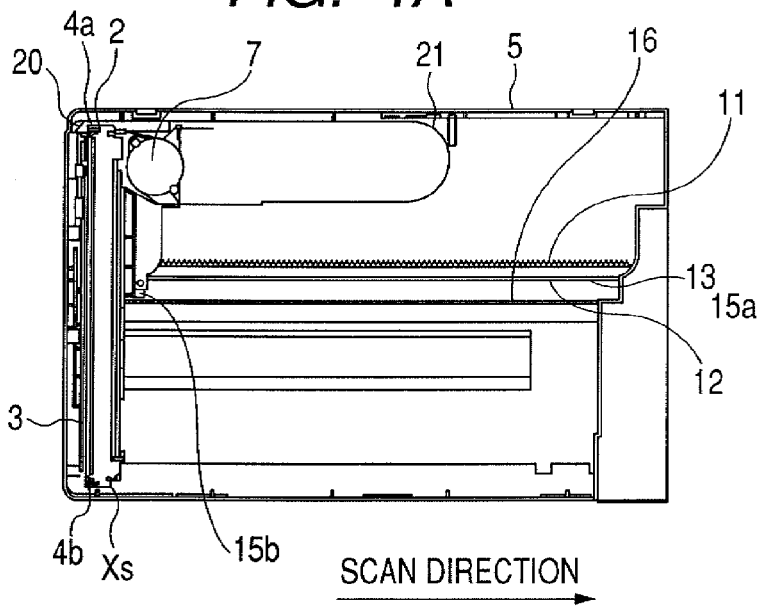
FIG. 1A is a top plan view for describing a whole image reading apparatus of the invention.
Figure 1D:
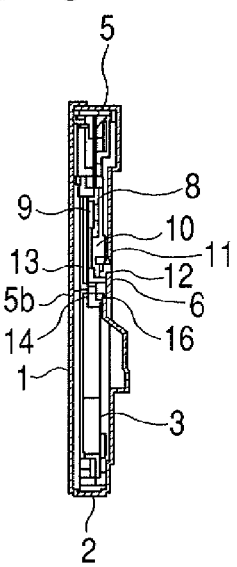
FIG. 1D is a right cross sectional view of the apparatus of FIG. 1A.
Figure 1B:
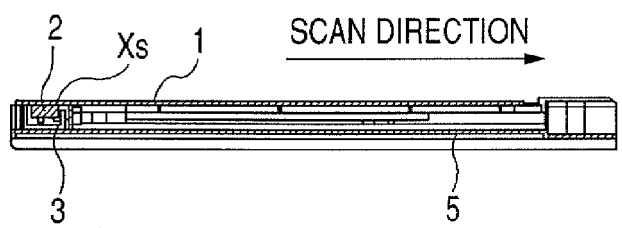
FIG. 1B is a main cross sectional view of the apparatus of FIG. 1A.
Figure 1C:
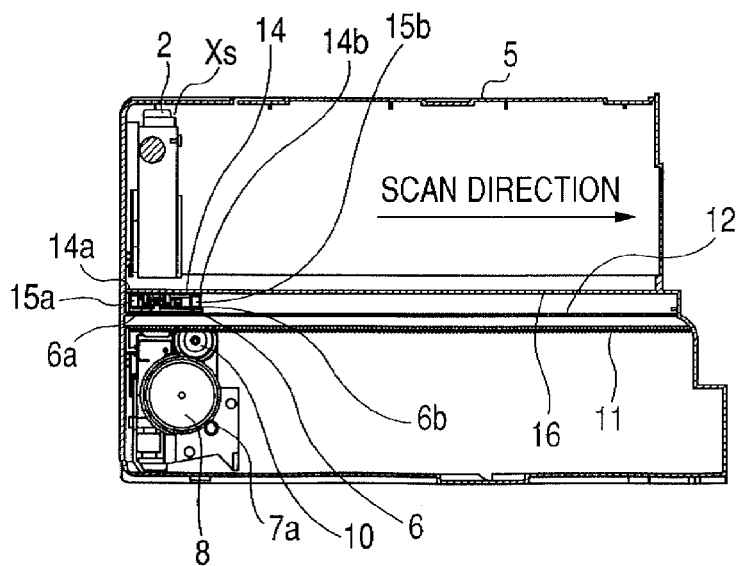
FIG. 1C is a bottom view of the apparatus of FIG. 1A.
Figure 2:
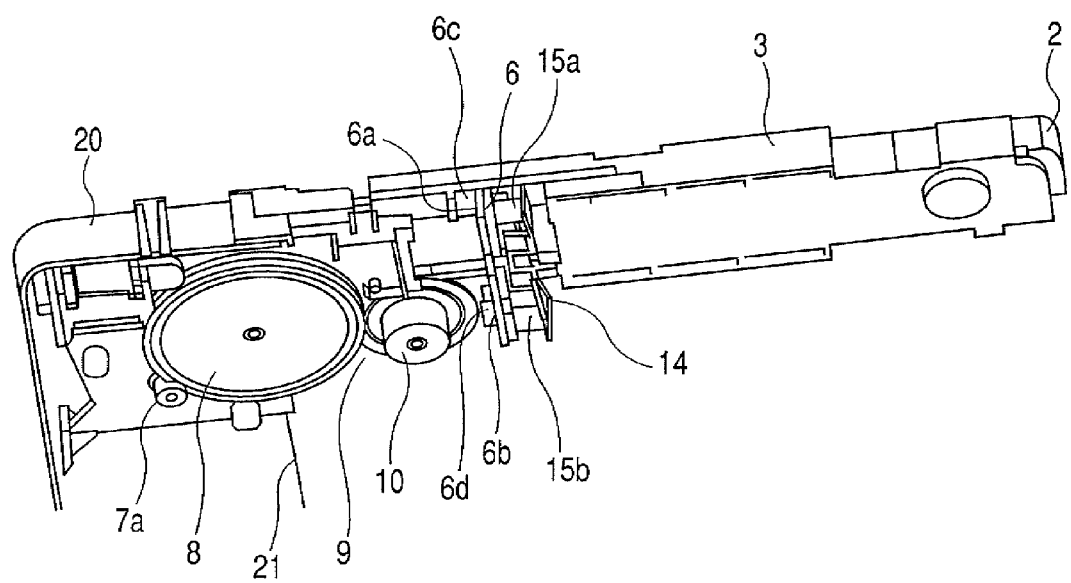
FIG. 2 is a perspective view of an image reading unit of the image reading apparatus of the invention.

In an embodiment, the invention is embodied in an image reading apparatus for fetching (or capturing) an image of an original document into a computer or the like. The embodiment will be described in detail hereinbelow with reference to the drawings. A construction of the embodiment will be described with reference to the drawings. FIG. 1B is a main cross sectional view of the embodiment. FIG. 1A is a top plan view of the embodiment. FIG. 1D is a right cross sectional view of the embodiment. FIG. 1C illustrates a bottom view of the embodiment. FIG. 2 illustrates a perspective view of a movable portion upon reading-scan.

An original glass plate 1 adapted to put the original thereon is provided in a main body frame 5 of the image reading apparatus. A contact image sensor (hereinafter, abbreviated to CIS) 2 for reading the image of the original is arranged on a lower surface of the original glass plate 1.

The CIS 2 is constructed as a unit by integrating: an LED for irradiating the original; a rod lens array for forming an image from reflection image light of the original obtained by the irradiation of the LED; and a photosensor device for photoelectrically converting the image formed by the rod lens array. The CIS 2 has a reading width corresponding to a width of the original and fetches (or captures) images of one line of the original image. The CIS 2 is fixed to a sensor holder 3. Spacer rollers 4a and 4b are rotatably fitted into an upper surface of the CIS 2. The CIS 2 is urged toward the original glass plate 1 by an urging unit (not shown). Thus, the spacer rollers 4a and 4b hit the original glass plate 1, so that the CIS 2 is scanned in the scan direction while keeping a predetermined distance from the original glass plate 1.

A step motor 7 is provided on the sensor holder 3. A motor gear 7a is provided at the step motor 7. The motor gear 7a is in engagement with a pinion gear 10 through idler gears 8 and 9 provided in the sensor holder 3. A slider 6 is fixed to the sensor holder 3. The slider 6 has two projecting portions (contact portions) 6a and 6b at both ends. A pressing slider 14 is provided in the sensor holder 3. The pressing slider 14 has two projecting portions 14a and 14b.

A rack portion 11 arranged in the scan direction is provided in the main body frame 5. The pinion gear 10 is in engagement with the rack portion 11. On the side opposite to the rack portion 11, the main body frame 5 has a guide rail 12 similarly arranged in the scan direction. Each of the rack portion 11 and the guide rail 12 has a cross sectional U-character shape as will be understood from the right cross sectional view of FIG. 1D. The guide rail 12 is a smooth flat surface extending in the scan direction. The projections 6a and 6b of the slider 6 are in contact with the guide rail 12. On the side of the guide rail 12 which faces the original glass plate 1, a cylindrical second height guide rail 13 extending in parallel with the guide rail 12 is provided. Height guide surfaces 6c and 6d existing almost at both ends of the slider 6 are in contact with the second height guide rail 13.

The guide rail has the following construction. The slider 6 is fixed to projections 3a and 3b projecting from the sensor holder 3. Compression coil springs 15a and 15b are arranged between the slider 6 and the pressing slider 14. The compression coil springs 15a and 15b press the projections 6a and 6b of the slider 6 to the guide rail 12 through the projections 3a and 3b of the sensor holder 3. The opposite sides of those springs press the projecting portions 14a and 14b of the pressing slider 14 to an urging guide rail 16 extending in the scan direction at a position which faces the guide rail 12 of the main body frame 5 in parallel with the guide rail 12. The guide rail 12 is provided integratedly with the main body frame 5. The main body frame 5 is formed by a resin part by injection molding. In this instance, a shape of the guide rail 12 is also formed in the same injection molding die as that of the main body frame and the guide rail 12 is integratedly injection molded, so that a reasonable and simple structure can be realized.

Figure 3:
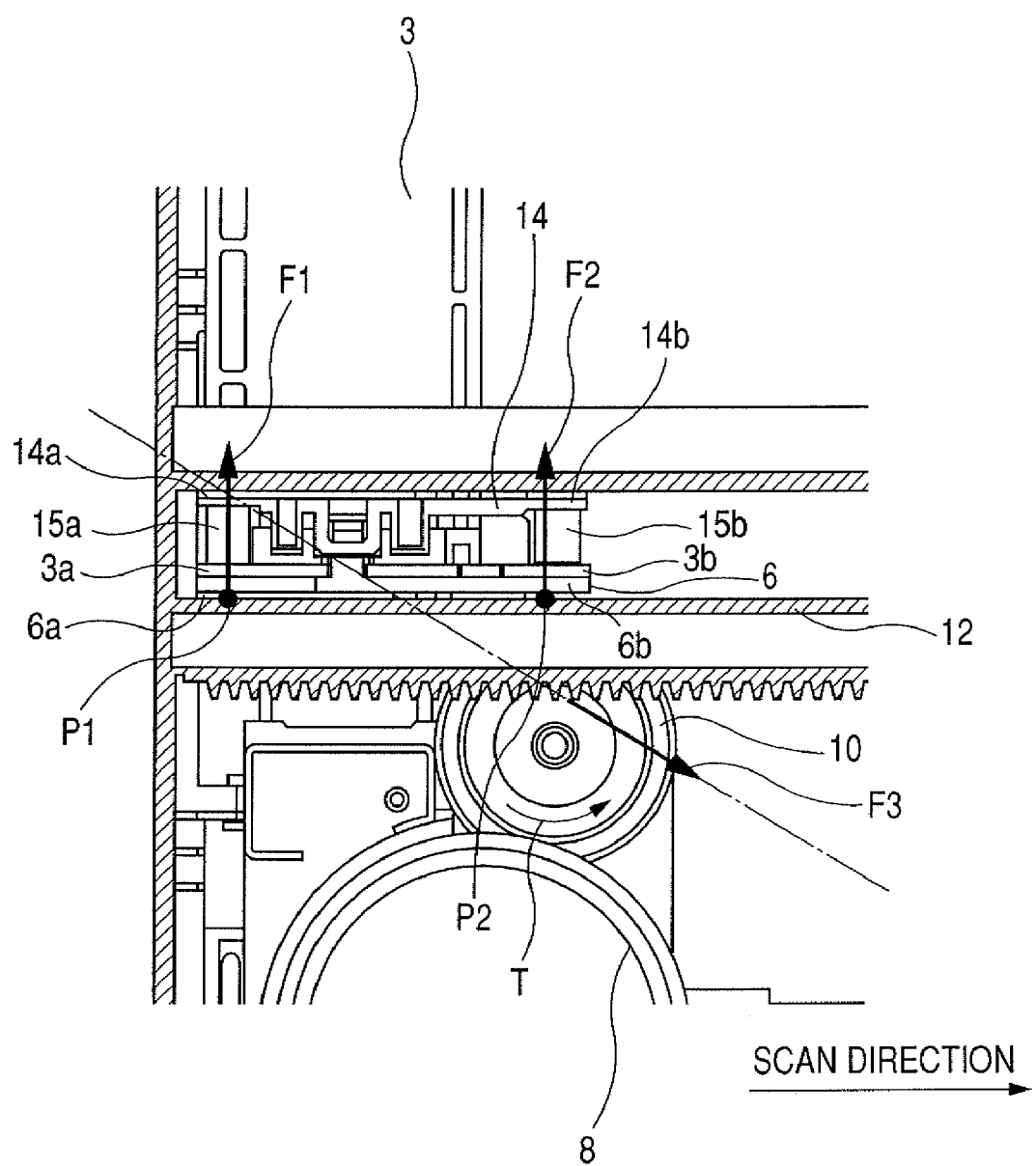
FIG. 3 is a bottom view of a main portion of the image reading unit of the image reading apparatus of the invention.

A bearing portion of the pinion gear 10 is arranged to the original glass plate 1 in the lateral direction of the CIS 2 so that the CIS 2 and the bearing portion of the pinion gear do not overlap in the height direction, thereby contributing to the realization of the thin size of the apparatus. As will be understood from FIG. 3, a driving gear train including the pinion gear is arranged on the downstream side in the scan direction of the CIS 2. Therefore, a bearing portion of the driving gear train can be also arranged in the lateral direction of the CIS 2. As illustrated in FIG. 3, when the CIS 2 moves in the scan direction, the pinion gear 10 is driven by the motor 7 in the direction shown by an arrow T in the diagram. At this time, a force which is received by the pinion gear 10 due to the engagement of the pinion gear 10 and the rack portion 11 becomes as shown at F3 in the diagram. F3 indicates the direction of a straight line drawn in the pressure angle direction from a contact point of the rack portion and the pinion gear.

Figure 4A:
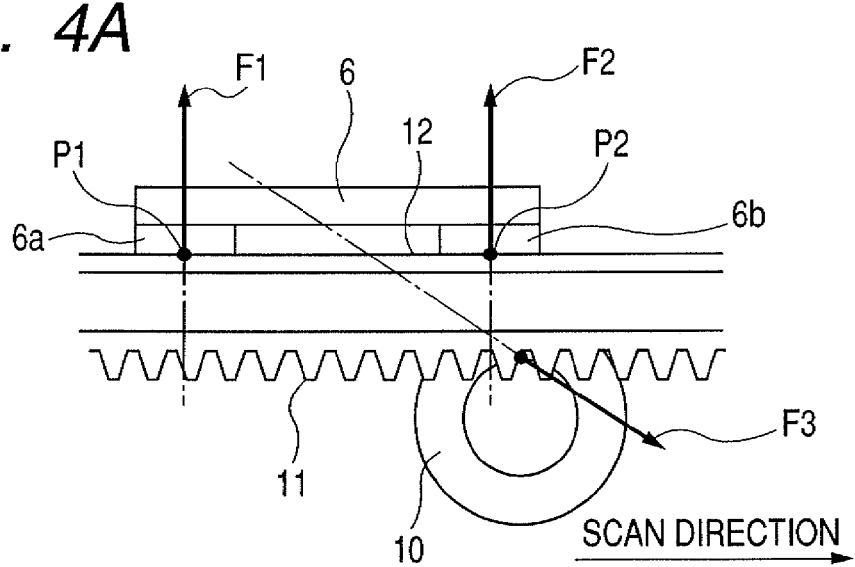
FIGS. 4A, 4B and 4C are schematic diagrams for describing a positional relation between contact portions and a pinion gear of the image reading apparatus of the invention.

A relation between an attaching position of the pinion gear 10 to the sensor holder 3 and the force F3 will be described hereinbelow with reference to FIGS. 3 and 4A to 4C. A force which is induced by F3 and which the projecting portion 6a of the slider 6 receives from the guide rail 12 is assumed to be F1. Similarly, a force which is induced by F3 and which the projecting portion 6b of the slider 6 receives from the guide rail 12 is assumed to be F2. F1 and F2 show the forces which are generated as a reaction force of F3 and do not include forces of the compression coil springs 15a and 15b. At this time, in the case of the construction in which the pinion gear 10 has been attached to the position of the downstream in the scan direction upon reading, a state as illustrated in FIG. 4A is obtained. The straight line in the extending direction of F3 passes between start points P1 and P2 of F1 and F2. In this instance, now considering a rotation moment (or a torque) around the start point P1 as a center, rotating directions of F2 and F3 are opposite and F2 and F3 are balanced. Therefore, F2 has a stable positive (+) value. Now considering a rotation moment around the start point P2 as a center, similarly, rotating directions of F1 and F3 are opposite and F1 and F3 are balanced. Therefore, F1 has a stable positive (+) value. This means that the guide structure can press the projecting portions 6a and 6b to the guide rail 12 merely by its own dynamic balance without making use of the forces of the compression coil springs 15a and 15b. If the image is read out when moving in this direction, the image can be stably read out without a swing, a fluctuation, or the like of the CIS 2.

Figure 4B:
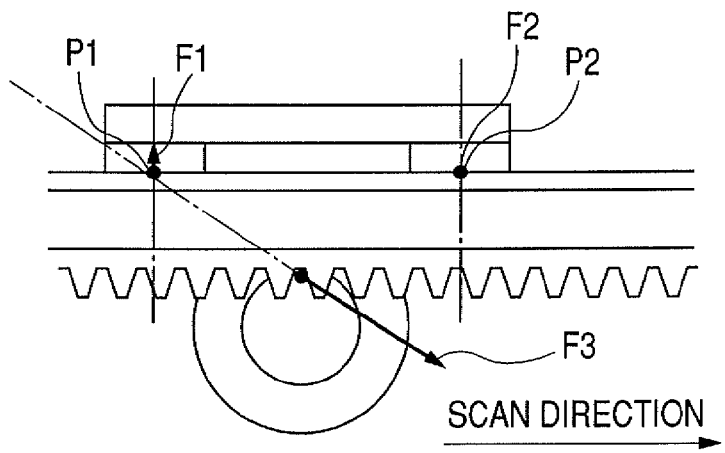

If the pinion gear exists in the scan direction and between the projecting portions 6a and 6b, a state as illustrated in FIG. 4B is obtained. In this case, the straight line in the extending direction of F3 passes almost in the direction where P1 exists or passes through a position out of a region between P1 and P2. In this instance, now considering the rotation moment around the start point P1 as a center, a rotation moment of F3 is almost close to 0. Therefore, the moment by F1 is equal to 0, that is, F1 is almost equal to 0. Thus, the projecting portion 6b is easily separated from the guide rail 12 and cannot be stably come into contact with the guide rail 12. In other words, the apparatus enters the state where the projecting portion 6b cannot be come into contact with the guide rail 12 if the forces of the compression coil springs 15a and 15b are not used. If the rack portion 11 and the guide rail 12 are not formed in the cross-sectional U-shape as described above but the back surface of the rack portion 11 is used as a guide rail 12, the extending line of F3 in FIG. 4B can pass between 6a and 6b. However, since the guiding and the driving are executed by one cantilever member, the structure is weak in shock, vibration, or the like.

Figure 4C:
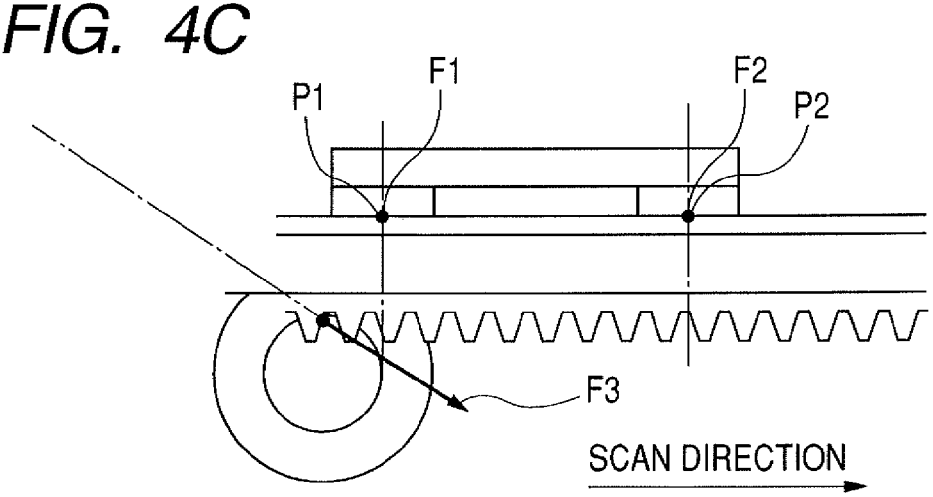

If the pinion gear exists in the reading/scan direction and in the upstream of the projecting portions 6a and 6b, a state as illustrated in FIG. 4C is obtained. In this case, the straight line in the extending direction of F3 passes through a position which is completely out of the region between P1 and P2. In this instance, now considering the rotation moment around P1 as a center, the rotation moment of F3 is counterclockwise in FIG. 4C. Therefore, the counterclockwise moment is applied to the CIS 2 and a force is applied to the projecting portion 6b in such a direction as to be completely separated from the guide rail 12, so that the projecting portion 6b cannot be stably come into contact with the guide rail 12. In other words, the apparatus enters the state where the projecting portion 6b cannot be come into contact with the guide rail 12 unless the forces of the compression coil springs 15a and 15b are used. Since the apparatus enters the state where the projecting portion 6b is forcibly pressed to the guide rail 12 by the compression coil springs 15a and 15b, if the image is read out when moving in such a direction, the swing, fluctuation, or the like occurs heavily in the movement of the CIS 2. A feeding fluctuation or the like occurs heavily in the read image.

In the embodiment, the shape is so determined as to satisfy the above conditions using the pressure angle of 20° of the pinion gear 10. The pressure angle is not limited to 20° but can be selected from various angles. A proper value is selected as a pressure angle according to the relation with the guide urging unit by the compression coil springs 15a and 15b.

A height of each gear of the pinion gear 10 and the rack portion 11 is not set to the height of what is called an ordinary tooth, but what is called a high-tooth is used. This means that upon designing of the gears, although a height from a pitch circle to a tip of the tooth in the case of the ordinary gear is set to a value which is one-time as large as a module of the tooth, a height to a tip of the present gear is set to a value which is 1.2 times as large as the module. Therefore, a height to a bottom of the tooth is set to a value which is 1.45 times as large as the module, thereby preventing a collision of the teeth. Since an engaging ratio of the gear is larger than that of the ordinary gear, the driving force is smoothly propagated at a high precision. Particularly, in the case of scanning an original having a straight line which is inclined in the scan direction by 45°, linearity of the read-out oblique line is improved.

In the invention, the step motor 7 is used as a motor. In the embodiment, an optical resolution of the CIS 2 is equal to 1200 dpi. A step angle of the step motor is equal to 3.75°. The gear pair has been designed in such a manner that when the step motor 7 is rotated by one step angle, that is, 3.75°, the CIS 2 is driven in the scan direction by a distance corresponding to one pixel of 1200 dpi, that is, by 21.1667 μm. A sensor signal line 20 for controlling a line sensor unit and extracting an image signal is connected to the upstream in the scan direction of the CIS 2. A motor signal line 21 for driving the motor is arranged in the downstream in the scan direction so that the signal lines 20 and 21 do not mutually approach.

The operation of the image reading apparatus of the embodiment will be described hereinbelow. The original whose image is to be read out is set onto the original glass plate 1 so that the image reading surface faces the original glass plate side. In the state where a power source of the image reading apparatus has been turned on, the CIS 2 is driven and stopped at an image reading start position Xs. When an instruction to fetch (or capture) the image is issued from a computer or the like (not shown) to the image reading apparatus, a driving signal is input to the motor 7 from a control unit (not shown) through the signal line 21 for driving the motor 7. Thus, the motor is rotated and this rotation is propagated to the pinion gear 10 through the idler gears 8 and 9. The pinion gear 10 is driven in the direction shown by an arrow T in FIG. 3. Since the pinion gear 10 is come into engagement with the rack portion 11, the CIS 2 is driven in the scan direction in the diagram. At the same time, the CIS 2 is controlled by the signal line 21. The signal line is constructed by a power line of the CIS 2, a ground line, a control line for allowing the LED to emit the light, a signal line for transmitting an image signal from the photosensor device, and the like. When the image reading is instructed, the CIS 2 is driven almost simultaneously with the driving of the motor 7. The activated LED irradiates the original. The rod lens array forms the image of the reflection light from the original onto the photosensor device. The photosensor device sends the image signal to the control unit of the scanner by the signal line 20. When the motor is driven and the CIS 2 is scanned, the CIS 2 has been held in the sensor holder 3. As for the CIS 2, the spacer rollers 4a and 4b hit the original glass plate 1 and a focal position of the rod lens array of the CIS 2 is fixed to the position of the original on an upper surface of the original glass plate 1.

The projections 3a and 3b of the sensor holder 3 which supports the CIS 2 are urged to the guide rail 12 by the compression coil springs 15a and 15b through the projecting portions 6a and 6b of the slider 6. Therefore, the CIS 2 can be moved along a flat surface of the guide rail 12. By the rotation of the pinion gear 10, the CIS 2 can be accurately driven in the scan direction. The projections 3a and 3b are actively urged to the guide rail 12 by the compression coil springs 15a and 15b. Therefore, for example, even if the forces are applied to the CIS 2 from the sensor signal line 20 and the motor signal line 21, F1 and F2 (see FIGS. 3 and 4A to 4C) are set to the negative values and the projecting portions 6a and 6b are not away from the guide rail 12, so that the CIS 2 is stably driven in the scan direction. Even if tractive forces of the sensor signal line 20 and the motor signal line 21 are large, by setting the values of the compression coil springs 15a and 15b to large values, F1 and F2 can be controlled lest they are set to the negative values. The extending straight line of the force F3 which the pinion gear 10 receives by the engagement of the pinion gear 10 and the rack portion 11 passes between the start points P1 and P2 of respective F1 and F2. Therefore, since F1 and F2 are not set to the negative values by the driving of the pinion gear 10, the CIS 2 can be stably driven. When the reading scan is finished and the CIS 2 reaches a right edge in FIG. 1A, the CIS 2 is moved to the left toward the position Xs in order to perform the next reading. Since the image reading operation is not executed at this time, the stable run is not always necessary. In the construction illustrated in FIG. 4A, the pinion gear 10 exists on the upstream side of the movement to the left. Therefore, although the stable guiding operation by the guide rail 12 cannot be performed only by the driving force of the pinion gear 10, the CIS 2 can stably run by the urging forces of the coil springs 15a and 15b.

In this manner, in the embodiment, while the step motor 7 is being driven, the CIS 2 reads the image of the original on the original glass plate while scanning it. Generally, a large amount of current flows in the signal line 21 for driving the step motor 7 in order to drive the motor. By such a current, an electromagnetic wave is generated from this signal line. Ordinarily, the electromagnetic wave influences, particularly, an image signal line of the sensor signal line 20 of the CIS 2, image noises are generated and the image deterioration is liable to occur. In the embodiment, the sensor signal line 20 is arranged on the upstream side in the scan direction of the CIS 2 and the motor signal line 21 is arranged on the downstream side in the scan direction of the CIS 2, thereby keeping a distance between them. Therefore, the electromagnetic wave from the motor signal line 21 hardly enters the sensor signal line 20 and the image deterioration does not occur, so that high picture quality is obtained.

Figure 5:
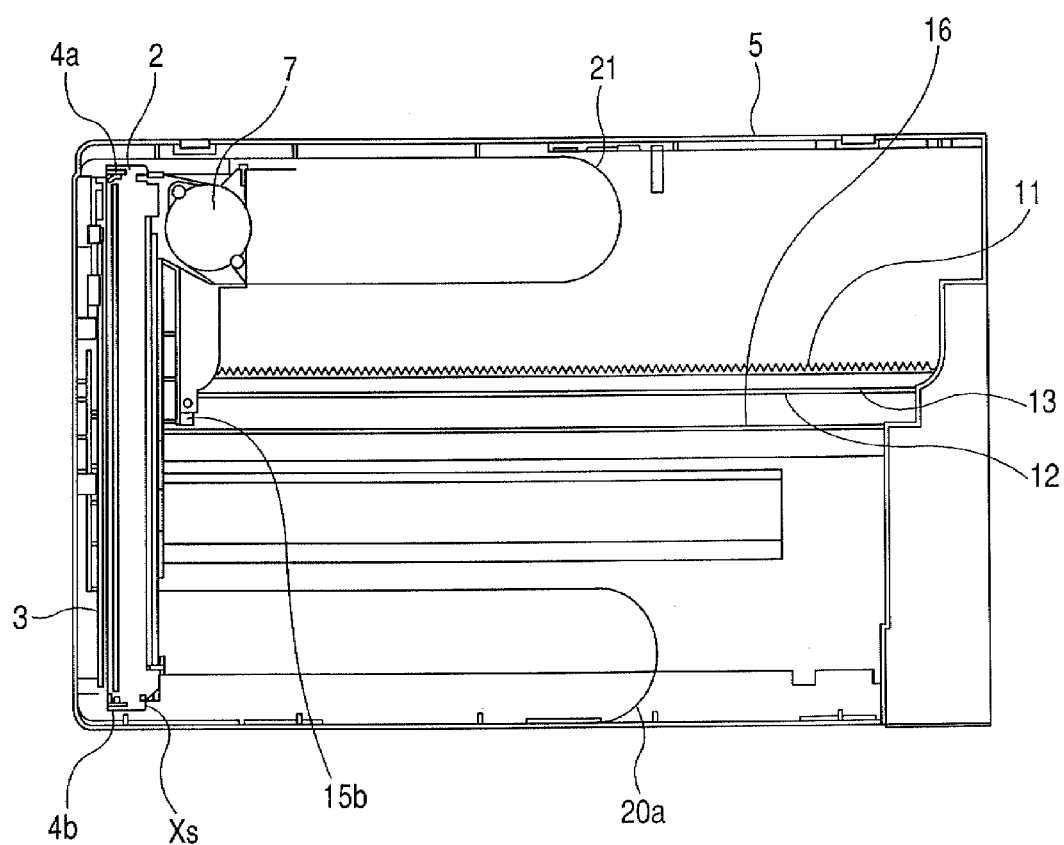
FIG. 5 is a diagram for describing another embodiment of an image reading apparatus of the invention.

FIG. 5 illustrates a modification of the embodiment. In this modification, as illustrated in FIG. 5, a sensor signal line 20a is led out from the side (lower side in FIG. 5) opposite to the step motor 7 and wired. Other construction and operation are substantially the same as those in the foregoing embodiment. By using such a construction, similarly, since the electromagnetic wave from the motor signal line 21 hardly enters the sensor signal line 20 and the image deterioration does not occur, the high picture quality is similarly obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-188044, filed Jul. 7, 2006, which is hereby incorporated by reference herein in its entirety.

What is claimed is:

1. An image reading apparatus comprising:
    an original plate onto which an original is placed;
    an image reading unit operable to move and scan along the original plate;
    a frame supporting the original plate;
    a guide rail provided in the frame in parallel with a moving direction of the image reading unit for reading/scanning; and
    a rack provided in the frame in parallel with the guide rail,
    wherein the image reading unit includes a sensor configured to read the original, a pinion gear adapted to engage with the rack, a driving unit configured to drive the pinion gear, and two contact portions adapted to come into contact with the guide rail, and
    wherein the pinion gear is arranged on a downstream side of the two contact portions in the moving direction upon reading.

2. The image reading apparatus according to claim 1, wherein a straight line drawn in a pressure angle direction between the rack and the pinion gear upon reading passes between the two contact portions when it is seen from an axial direction of the pinion gear.

3. The apparatus according to claim 1, wherein the rack and the guide rail are made of a resin molded integrally with the frame.

4. The apparatus according to claim 1, further comprising first and second bundles of signal lines each electrically connecting to a circuit board provided in the frame and the image reading unit,
    wherein for the moving direction, the first bundle of signal lines is arranged in an upstream direction of the image reading unit and the second bundle of signal lines is arranged in the downstream direction of the image reading unit.

5. The apparatus according to claim 1, further comprising first and second bundles of signal lines each electrically connecting to a circuit board provided on the frame and the image reading unit,
    wherein the first bundle of signal lines is arranged on one side of the image reading unit for the rack and the second bundle of signal lines is arranged on the other side of the image reading unit for the rack.

6. The apparatus according to claim 1, wherein in the image reading unit, a bearing portion of the pinion gear is arranged on the downstream side in the moving direction upon reading for the sensor.

* * * * *